United States Patent [19]

Collins

[11] 4,342,725

[45] Aug. 3, 1982

[54] OXYGEN SUPPLY APPARATUS

[75] Inventor: John F. Collins, Lexington, Ky.

[73] Assignee: Preiser Scientific, Incorporated, Charleston, W. Va.

[21] Appl. No.: 952,658

[22] Filed: Oct. 19, 1978

[51] Int. Cl.[3] .......................... A62B 7/08; B01J 7/00

[52] U.S. Cl. .......................... 422/126; 128/202.26; 422/116; 422/117; 422/120; 422/166

[58] Field of Search .............. 422/120, 122, 125, 126, 422/165, 167, 117, 116, 305, 119; 128/142 R, 149, 191 R, 202.19, 202.26

[56] References Cited

U.S. PATENT DOCUMENTS

| | | | |
|---|---|---|---|
| 996,135 | 6/1911 | Poe | 128/142 |
| 2,818,066 | 12/1971 | Glidden | 128/142 |
| 3,527,214 | 9/1970 | Rio | 128/202.26 |
| 3,536,456 | 10/1970 | Bovard | 422/120 |
| 3,565,068 | 2/1971 | Bickford | 422/120 |
| 3,736,104 | 5/1973 | Churchill et al. | 422/120 |
| 3,737,287 | 6/1973 | Churchill et al. | 422/120 |
| 3,756,785 | 9/1973 | Nettleland | 422/120 |
| 3,767,367 | 10/1973 | Rio | 128/142 X |
| 3,955,931 | 5/1976 | Thompson | 128/142.3 |
| 4,019,507 | 4/1977 | Oetjen et al. | 128/142 R |
| 4,140,765 | 2/1979 | Martin et al. | 422/166 |

FOREIGN PATENT DOCUMENTS

| | | | |
|---|---|---|---|
| 601295 | 5/1948 | United Kingdom | 422/166 |

OTHER PUBLICATIONS

JRC; SOS. (Solid Oxygen System).
S.O.S. Tech. Data Sheet 3445-C, Model 415.

*Primary Examiner*—Michael S. Marcus
*Attorney, Agent, or Firm*—Raymond F. Kramer

[57] ABSTRACT

An oxygen supply apparatus, particularly for use by a coal miner, has a plurality of housings mounted on a belt, which is worn by the miner, with each housing having a cartridge of oxygen generating material therein and removable from the bottom thereof for replacement. Each housing has a cover with a resiliently biased shaft supported thereby for relative movement to activate the oxygen generating material in the cartridge. The shaft functions as a timer activator so that the timer is set when the shaft is activated. The timer produces an alarm signal just prior to the expiration of time for depletion of oxygen from the cartridge within the housing. Each of the covers has a chamber receiving the oxygen from the cartridge and supplying it through tubing to oxygen receiving means worn by the miner such as a mask, for example. A ball check valve is disposed in the tubing from the cover prior to a main tubing so that oxygen from any of the cartridges can flow only to the mask while another of the cartridges is substituted in one of the housings for a depleted cartridge.

6 Claims, 8 Drawing Figures

OXYGEN SUPPLY APPARATUS

Whenever an accident occurs in a coal mine, there is usually depletion of the oxygen supply in a relatively short period of time. Thus, while a miner may not be killed or even injured in the accident such as an explosion, for example, the inability to have a supply of oxygen to breathe results in the death of the miner in a relatively short period of time.

Therefore, it is desired for a miner to be able to carry a supply of oxygen without the apparatus being too heavy or interfering with the miner's work whereby the miner would not wear it. The oxygen supply apparatus also must be capable of having any requirement for starting and/or controlling the supply of oxygen being performed in the dark. It also is necessary for the miner to be warned of the depletion of any supply of oxygen prior to it occurring.

While the supply of oxygen serially from a plurality of cartridges of oxygen generating material is disclosed in U.S. Pat. No. 3,756,785 to Netteland, the apparatus of the aforesaid Netteland patent is designed for use by patients having respiratory ailments and for respiratory and cardiac emergencies. The apparatus of the aforesaid Netteland patent is bulky and heavy and could not be worn by a miner while working. Furthermore, the apparatus of the aforesaid Netteland patent has no means for providing an alarm signal when one of the cartridges is depleted so that the next cartridge of oxygen generating material can be ignited.

In the apparatus of the aforesaid Netteland patent, the replacement of a cartridge requires the removal of a cover and an actuator sleeve, which activates the cartridge. Thus, this could not be accomplished in the dark.

Additionally, the oxygen supply apparatus of the aforesaid Netteland patent does not have any means for preventing flow of the oxygen to the chamber from which the depleted cartridge is removed. While this loss of oxygen may be immaterial where there is a relatively large supply of oxygen generating cartridges, this cannot be utilized in an area such as a coal mine, for example, where the supply of cartridges of oxygen generating material is limited, possibly to those carried by the miner.

The oxygen supply apparatus of the present invention is capable of meeting the requirements for use by a coal miner while overcoming the disadvantage of the apparatus of the aforesaid Netteland patent insofar as utilization of the apparatus of the aforesaid Netteland patent in a coal mine. The oxygen supply apparatus of the present invention is of relatively light weight so that it can be worn by the miner at all times without discomfort. The total weight of the oxygen supply apparatus of the present invention with four cartridges of oxygen generating material is about four and one-half pounds. This relatively light weight and the arrangement of the apparatus are such that there is no interference with the miner's work.

In addition to being relatively light weight, the oxygen supply apparatus of the present invention prevents the flow of oxygen from the cartridge to any of the other housings and only to oxygen receiving means such as a mask, for example. Thus, when one of the replaceable cartridges is being replaced, there is no flow of oxygen to the ambient from the oxygen generating cartridge in one housing through another housing from which the depleted cartridge is removed.

The oxygen supply apparatus of the present invention also prevents inadvertent activation of any of the oxygen generating cartridges while obtaining the start of timing of the production of oxygen from a cartridge when the cartridge is activated. Thus, the oxygen supply apparatus of the present invention produces an alarm signal a predetermined period of time after the oxygen generating cartridge has been ignited with this predetermined period of time being no greater than the time period for depletion of the cartridge and preferably slightly less.

An object of this invention is to provide a portable oxygen supply apparatus.

Another object of this invention is to provide a relatively light weight oxygen supply apparatus, particularly for use by a coal miner in the event of an accident.

A further object of this invention is to provide an oxygen supply apparatus in which an alarm signal is produced when the supply of oxygen is about to cease.

Other objects of this invention will be readily perceived from the following description, claims, and drawings.

This invention relates to an oxygen supply apparatus including a support member and a plurality of housings with means to support each of the housings on the support member. Each of the housings has a cartridge of oxygen generating material disposed therein with means to insulate against transmission of heat from the cartridge to the housing during generation of oxygen from the oxygen generating material. Each of the housings has a cover, which has a chamber therein to receive oxygen from the cartridge when the oxygen generating material in the cartridge is ignited. Each of the chambers communicates with oxygen receiving means, which is to be worn by a user, by suitable means. Each of the covers has means to cause ignition of the oxygen generating material within the cartridge in the housing having the cover.

The attached drawings illustrate preferred embodiments of the invention, in which.

Figures 1, 5, 7, 8:
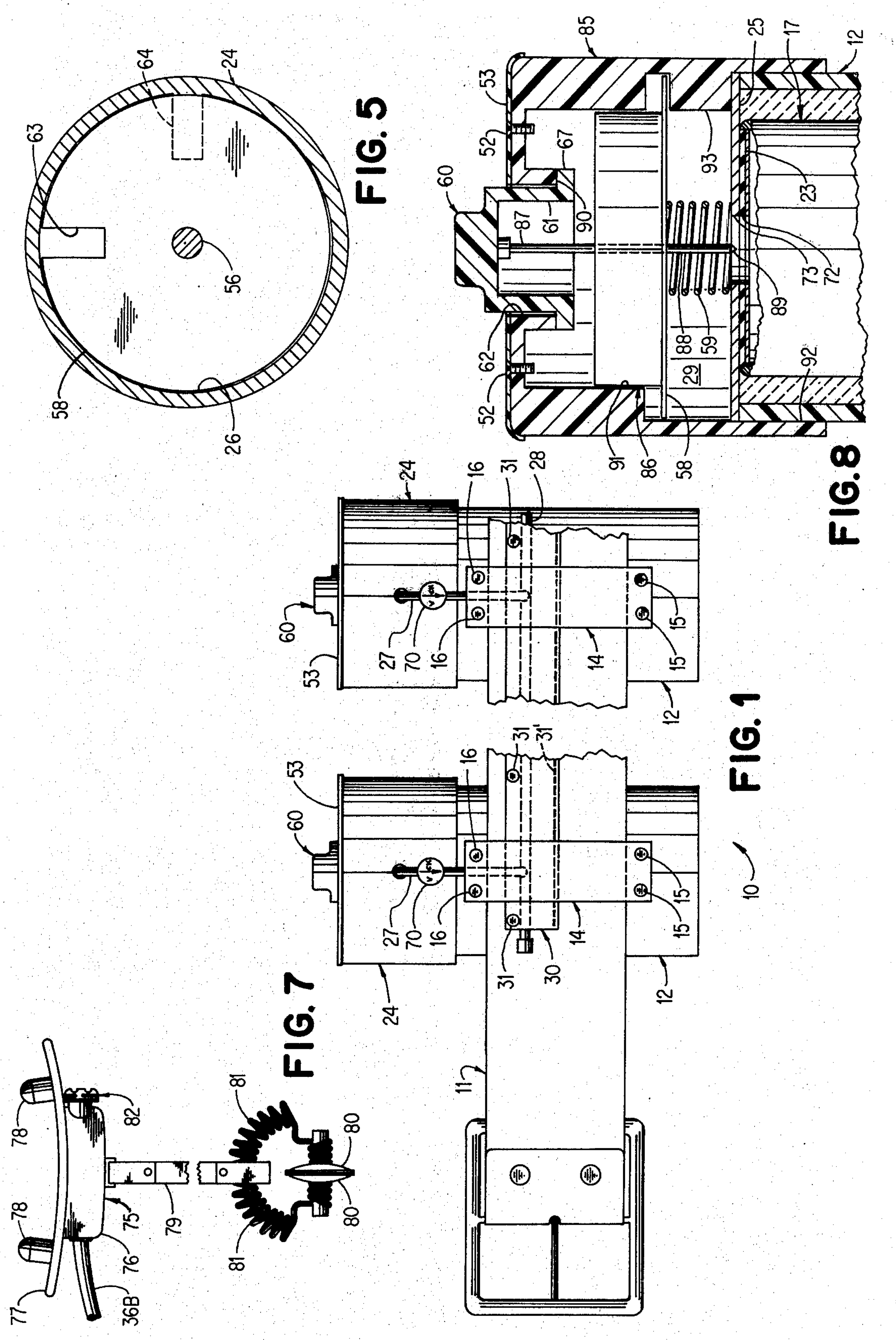
FIG. 1 is an elevational view of a portion of an oxygen supply apparatus of the present invention, taken from the inside of a belt to be worn by the user.
FIG. 5 is a sectional view, partly in plan, of a housing cover and taken along line 5—5 of FIG. 3.
FIG. 7 is a top plan view showing a mouthpiece and nose clamp for use with the oxygen supply apparatus in place of the mask.
FIG. 8 is a sectional view, partly in elevation, of a modification of the cover of the oxygen supply apparatus of the present invention.

Referring to the drawings and particularly FIG. 1, there is shown an oxygen supply apparatus 10, which is particularly useful by a coal miner but may be utilized wherever oxygen is required to be generated. The apparatus 10 includes a belt 11, which is preferably formed of leather, having a plurality of housings 12 mounted thereon. Each of the housings 12 is formed of a suitable light weight material, such as polyvinyl chloride, for example.

Each of the housings 12 is attached to the belt 11 by a flexible strap 14, which is preferably formed of leather. Each of the straps 14 has a pair of snap fasteners 15 at its lower end for cooperation with a pair of snap fasteners (not shown) on the exterior of the housing 12 to be connected thereto. Each of the straps 14 has a second pair of snap fasteners 16 on its upper end for cooperation with a second pair of snap fasteners (not shown) on the exterior of the housing 12 to be connected thereto. Thus, each of the housings 12 is removably connected to the belt 11 for support thereby.

The same number of the housings 12 are preferably disposed on each side of the belt 11 so that an equal number of the housings 12 are disposed on each hip of the user. While two of the housings 12 have been shown as mounted on one side of the belt 11, it should be understood that the number of the housings 12 could be increased or decreased depending upon the requirements of the time period for oxygen to be supplied and the period of time that oxygen is generated from a cartridge 17 (see FIG. 3) of oxygen generating material disposed within each of the housings 12.

One suitable example of the cartridge 17 of oxygen generating material is shown and described in U.S. Pat. No. 3,736,104 to Churchill et al. Any other suitable oxygen generating means may be employed.

Because of the relatively high temperature produced by ignition of the oxygen generating material within the cartridge 17, a layer 18 of heat insulating material is disposed between the cartridge 17 and the housing 12 in surrounding relation to the cartridge 17. One suitable example of the layer 18 of heat insulating material is a ceramic fiber material sold by Babcock and Wilcox as KAOWOOL. The layer 18 of heat insulating material is mounted on inner wall 19 of the housing 12.

The bottom end of one or more of the housings 12 on each side of the belt 11 (see FIG. 1) has a removable cap 20 (see FIG. 3) threadedly connected thereto. A spring 21, which is secured to the cap 20 and to a metal tray 22, continuously urges the metal tray 22 upwardly when the cap 20 is threadedly mounted within the housing 12. The metal tray 22 engages the bottom end of the cartridge 17 to support the cartridge 17 within the housing 12.

Thus, the spring 21 holds the upper end of the cartridge 17 against an annular resilient gasket 23, which is preferably formed of rubber, in a cover 24, which is preferably formed of polyvinyl chloride, for the housing 12. The cover 24 fits over the housing 12 and has an annular plate 25, which carries the gasket 23 engaging the top of the housing 12 by having the gasket 23 secured thereto by suitable means, such as glue, for example. The plate 25, which is preferably formed of metal, is secured to inner wall 26 of the cover 24 by suitable means, such as glue, for example.

Figure 2:
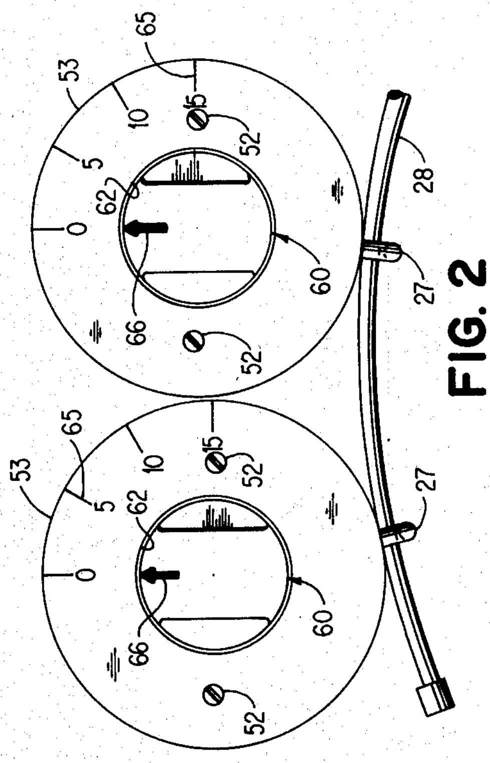
FIG. 2 is a top plan view of a portion of the oxygen supply apparatus of FIG. 1.

The cover 24 has a hollow tube 27 (see FIG. 1), which is preferably formed of stainless steel, extending downwardly from its outer surface. The tube 27 is connected to a curved hollow tube 28 (see FIGS. 1 and 2) and communicates with a chamber 29 (see FIG. 3) within the interior of the cover 24 so as to provide communication therebetween.

The tube 28 (see FIG. 1) is supported on the belt 11 by a strip 30, which is formed of the same material as the belt 11, having its lower end secured to the inner side of the belt 11 by suitable means, such as sewing, for example, as indicated at 31'. The upper end of the strip 30 has snap fasteners 31 thereon for cooperation with snap fasteners (not shown) on the inner side of the belt 11. There are two of the strips 30 on the belt 11. A pouch or case 32 (see FIG. 4), which is preferably formed of the same material as the belt 11, is on the outer side of the belt 11 and overlapping the adjacent ends of the strips 30.

When the fasteners 31 (see FIG. 1) are secured to the fasteners on the belt 11, each of the tubes 28 is held between the interior of the belt 11 and one of the strips 30 and bears against the adjacent fasteners 31 to hold the cover 24 on the housing 12 and against the force exerted on the cover 24 through the cartridge 17 (see FIG. 3) by the spring 21. Therefore, the plate 25 engages the top of the housing 12 when the strips 30 (see FIG. 1) are secured to the belt 11 by the snap fasteners 31.

Figure 4:
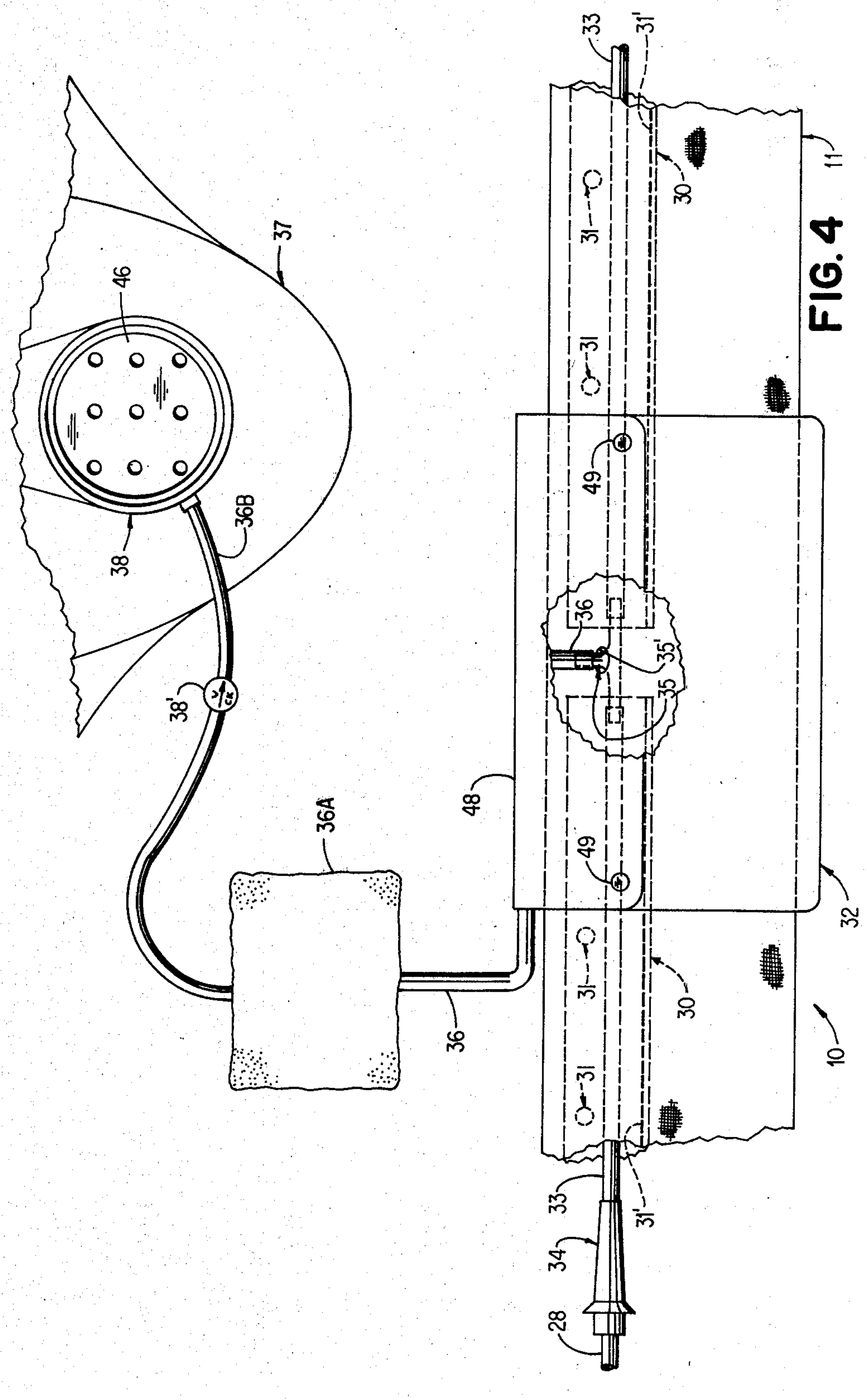
FIG. 4 is an elevational view of another portion of the oxygen supply apparatus of the present invention, taken from the exterior side of the belt, shown with a breathing mask communicated with the source of oxygen.

As shown in FIG. 4, each of the tubes 28 is connected to a plastic hose 33 through a connector 34, which is integral with the hose 33. The end of the tube 28 has serrations for cooperation with the interior of the connector 34 to connect the tube 28 thereto.

Each of the plastic hoses 33 is connected to a T-shaped metal connector 35, which extends into the pouch 32 through an opening 35' in the belt 11. The pouch 32 is open in its back in the area of the belt 11 so that the belt 11 forms this portion of the back of the pouch 32. The pouch 32 is secured to the belt 11 by any suitable means, such as sewing, for example.

The connector 35 connects each of the two plastic hoses 33 to a flexible hose 36, which is preferably formed of rubber. The hose 36 is connected to a bag 36A, which is formed of a suitable flexible material, such as rubber, for example, and is capable of holding a predetermined quantity of oxygen therein. This provides a reservoir of oxygen for use upon demand by the user.

A hose 36B, which is preferably formed of rubber, connects the bag 36A to oxygen receiving or breathing means, which is worn by the user for breathing oxygen, such as a rubber mask 37, for example, through a valve 38 on the mask 37. The hose 36B has a check valve 38' therein to allow flow from the bag 36A to the mask 37 while preventing flow from the mask 37 to the bag 36A.

Figure 6:
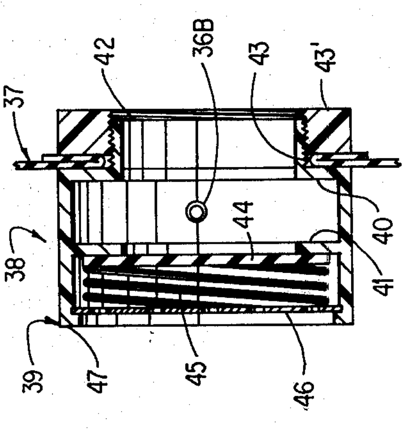
FIG. 6 is a sectional view of the oxygen intake portion of the mask.

As shown in FIG. 6, the valve 38 includes a housing 39 having the hose 36B connected thereto between a pair of annular flanges 40 and 41 on the inner surface of the housing 39. The housing 39 includes an annular threaded portion 42 extending into the mask 37 through an opening 43 in the mask 37. A locking nut 43' is threaded on the annular threaded portion 42 of the housing 39 to secure the housing 39 to the mask 37.

A rubber disc 44 is held against the flange 41 by a spring 45. One end of the spring 45 bears against the rubber disc 44, to which it is fixed, and the other end bears against a perforated disc 46 to which it is fixed. The disc 46 is preferably formed of aluminum and bears against an outer flange 47 of the housing 39 to which it is fixed.

Accordingly, when one of the cartridges 17 (see FIG. 3) is generating oxygen, oxygen is continuously supplied to the wearer of the mask 37 (see FIG. 4) through the hose 36B and the valve 38. When the wearer of the mask 37 exhales, the rubber disc 44 (see FIG. 6) moves against the force of the spring 45 to enable exhaled air to flow past the rubber disc 44, which is of smaller diameter than the diameter of the inner surface of the housing 39, to the ambient through the perforated disc 46.

When not in use, the mask 37 (see FIG. 4) is disposed within the pouch 32. The pouch 32 has a flap 48, which is held in its closed position by a pair of snap fasteners 49 thereon cooperating with a pair of snap fasteners (not shown) on the front of the pouch 32, to provide access to the interior of the pouch 32. Thus, the mask 37 is retained within the pouch 32 except when required for use.

Each of the covers 24 (see FIG. 3) has a timer 50 disposed therein. The timer 50 is selected so that it produces an alarm signal through a bell, for example, a predetermined period of time after being activated. The predetermined period of time in which the bell produces an alarm signal after the timer 50 is activated is no greater than the time for depletion of the oxygen from the cartridge 17 and preferably slightly less, such as one minute less, for example. Thus, if the cartridge 17 produces oxygen for fifteen minutes after being ignited, the timer 50 would produce the alarm signal fourteen minutes after having been activated. This would give the wearer of the mask 37 enough time to ignite another of the cartridges 17 in one of the housings 12.

One suitable example of the timer 50 is sold by Preiser Scientific Corporation, Charleston, West Virginia as model No. TET-9000-01. Any other suitable timing mechanism may be employed as the timer 50 as long as an alarm signal is produced after a predetermined period of time.

The timer 50 is held in vertically spaced relation to the top of the cover 24 by a pair of spacers 51. The timer 50 is secured to the cover 24 by a pair of screws 52 extending through a pair of holes in an indicating plate 53, a pair of holes in the top of the cover 24 on which the indicating plate 53 is mounted, and passages in the spacers 51. This positions the timer 50 at a desired angular location within the cover 24 relative to the indicating plate 53.

The timer 50 has a shaft 56 extending therethrough and projecting downwardly therefrom with a pointed end 57. When the pointed end 57 is moved downwardly to pierce the top of the cartridge 17, ignition of the oxygen generating material therein occurs in the manner described in the aforesaid Churchill et al. patent.

An annular plate 58 is secured to the shaft 56 for movement therewith whenever the shaft 56 is depressed to cause the pointed end 57 to puncture the cartridge 17 and cause ignition of the oxygen generating material therein. A spring 59, which has one end acting against the plate 25 and its other end acting against the plate 58, continuously urges the pointed end 57 of the shaft 56 away from the cartridge 17.

The upper end of the shaft 56 has an activating element 60 fixed thereto for movement therewith. The activating element 60 has a cylindrical portion 61 riding within a circular guide opening 62 in the top of the cover 24. Accordingly, the activating element 60 can be both rotated relative to the cover 24 and moved vertically relative to the cover 24.

Downward movement of the shaft 56 is prevented until a slot 63 (see FIG. 5) in the plate 58 is aligned with a rib 64 extending radially inwardly from the inner wall 26 of the cover 24. This alignment of the slot 63 with the rib 64 can occur only after the shaft 56 has been rotated by the activating element 60 (see FIG. 3) to set the timer 50 at the desired time period through the shaft 56 rotating a gear in the timer 50 connected thereto for rotation therewith while permitting vertical movement of the shaft 56. Thus, ignition of the oxygen generating material within the cartridge 17 cannot occur until the timer 50 has been set at the desired period of time so as to sound an alarm signal no later than when the time period of depletion of the oxygen from the cartridge 17 has expired.

The indicating plate 53 (see FIG. 2) has indicia 65 thereon to indicate the time remaining through cooperation with a pointer 66 on the activating element 60. Thus, the activating element 60 can only be rotated, because of the mechanism within the timer 50, to the position in which the slot 63 (see FIG. 5) in the plate 58 aligns with the rib 64 on the cover 24. At this point, depression of the activating element 60 (see FIG. 3) can occur to enable the pointed end 57 of the shaft 56 to penetrate the top of the cartridge 17 against the force of the spring 59. It should be understood that the slot 63 is in the position of FIG. 5 when the pointer 66 is in the position of FIG. 2.

As soon as penetration occurs, the activating element 60 is released, and the spring 59 returns the plate 58, the shaft 56, and the activating element 60 to the initial vertical position. In this position, a flange 67 on the lower end of the activating element 60 engages a surface 68 of the cover 24 to form a seal therewith. This prevents loss of oxygen from the cartridge 17 to the ambient. If desired, one or both of the flange 67 and the surface 68 can have suitable sealing means thereon.

Each of the tubes 27 (see FIG. 1) preferably has a check valve 70, which is preferably a resiliently biased ball check valve, disposed therein to prevent communication of the chamber 29 (see FIG. 3) in any of the covers 24 with the chamber 29 in any of the other covers 24. Thus, when the oxygen generating material in one of the cartridges 17 is depleted, it is only necessary to remove the bottom cap 20 whereby the cartridge 17 will fall from the housing 12 and insert another of the cartridges 17 with oxygen generating material therein if such is available. Thus, this would extend the period of time that the wearer of the mask 37 (see FIG. 4) could receive oxygen from the oxygen supply apparatus 10 of the present invention.

Because of the heat generated from the cartridge 17 (see FIG. 3) during production of oxygen therefrom by the oxygen generating material, the cap 20 has openings 71 therein. The openings 71 vent some of the generated heat from the cartridge 17 to the ambient air.

Although highly advantageous, as indicated elsewhere in this specification, it is not a requisite that the housings 12 have the removable cap 20. Of course, it is necessary that there be the spring 21 to urge the cartridge 17 against the gasket 23 to insure that the oxygen flows into the chamber 29 from the cartridge 17. However, the use of the cap 20 enables the replacement by another cartridge, if such is available, of the cartridge 17 after depletion of the oxygen generating material therein, to extend the period of time that the oxygen supply apparatus 10 can supply oxygen.

Considering the operation of the oxygen supply apparatus 10 of the present invention, the belt 11 is worn by a miner, for example, at all times and if an accident should occur in the mine, the miner would remove the mask 37 (see FIG. 4) from the pouch 32 and secure it in position for utilization.

Then, one of the activating elements 60 (see FIG. 3) of the covers 24 would be rotated until rotation is stopped by the mechanism within the timer 50. This would occur when the timer 50 is set for the total time period for oxygen generation from the cartridge 17, such as fifteen minutes, for example.

Figure 3:
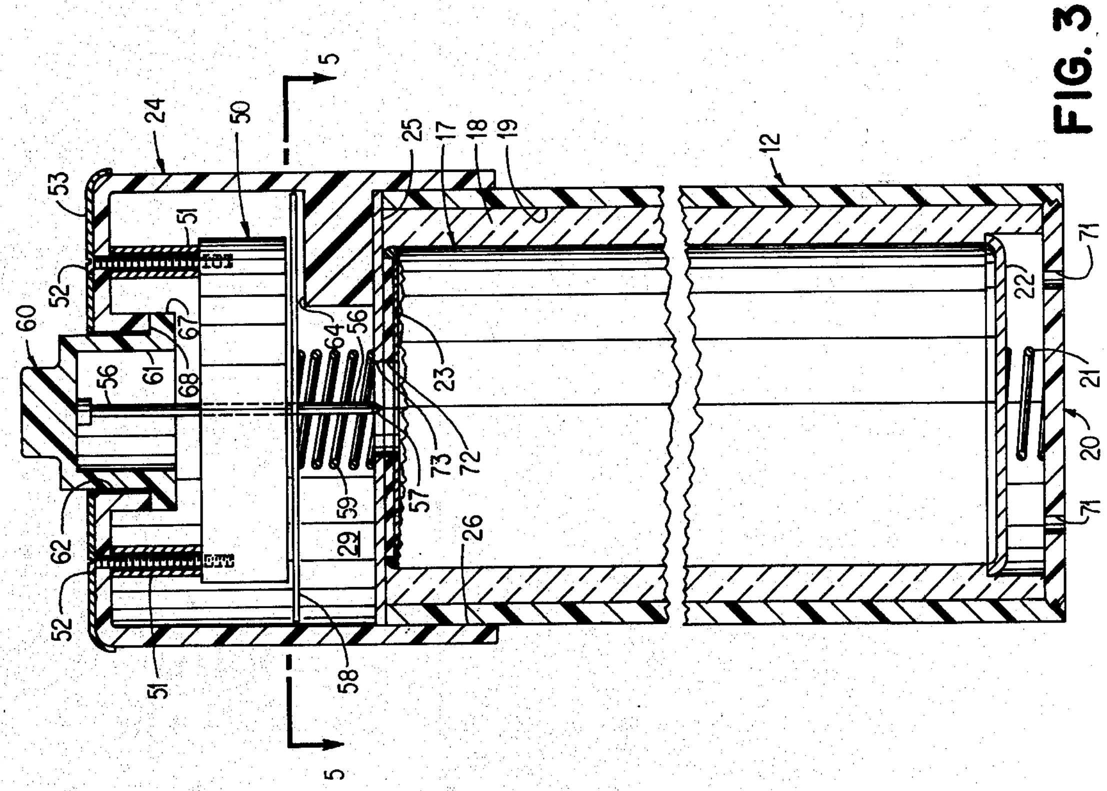
FIG. 3 is a sectional view, partly in elevation, of one of the housings and the cover of the oxygen supply apparatus of the present invention.

At this time, the miner would depress the activating element 60 since the slot 63 (see FIG. 5) in the plate 58 is aligned with the rib 64 to enable the plate 58 to move downwardly against the force of the spring 59 (see FIG. 3). The downward movement of the shaft 56 causes the pointed end 57 to puncture the top of the cartridge 17. This causes ignition of the oxygen generating material in the cartridge 17 so that production of oxygen occurs in the manner described in the aforesaid Churchill et al. patent.

The oxygen flows through openings 72 and 73 in the gasket 23 and the plate 25, respectively, into the chamber 29 in the cover 24. The oxygen then passes through the tube 27 (see FIG. 1) and the check valve 70 therein to the tube 28. The oxygen then flows through the connector 34 (see FIG. 4), the hose 33, the connector 35, the hose 36, the bag 36A, and the hose 36B, including check valve 38', to the valve housing 39 of the valve 38 on the mask 37. Thus, oxygen is continuously supplied to the interior of the mask 37 and to the miner. During each exhalation by the miner, the rubber disc 44 (see FIG. 6) is moved against the force of the spring 45 to enable exhalation of air from the interior of the mask 37 to the ambient through the perforated disc 46.

The timer 50 (see FIG. 3) will produce an alarm signal at a selected time after activation of the timer 50 has been started by rotation of the activating element 60. This selected time period is preferably one minute prior to the expiration of the generation of oxygen by the oxygen generating material within the cartridge 17.

When the alarm signal from the timer 50 occurs, then the miner rotates the activating element 60 on another of the covers 24. When rotation of the activating element 60 is completed through a stopping mechanism within the timer 50, the slot 63 (see FIG. 5) in the plate 58 is aligned with the rib 64 to allow depression of the activating element 60 (see FIG. 3) to cause ignition of the oxygen generating material in another of the cartridges 17. The oxygen again flows to the interior of the mask 37 (see FIG. 4) in the manner previously described.

The depleted cartridge 17 (see FIG. 3) can then be replaced by removing the metal cap 20 from the bottom of the housing 12. Another of the cartridges 17, if available, can then be inserted into the housing 12, and retained is therein by the cap 20.

Referring to FIG. 7, there is shown another form of breathing or oxygen receiving means for use in place of the mask 37. A mouthpiece 75 has oxygen supplied to a chamber (not shown) within a housing 76 through the hose 36B. The housing 76 has a rubber plate 77 integral therewith, which has an opening (not shown) therein communicating with the chamber in the housing 76 to enable oxygen from the hose 36B to flow into the mouth of the user. The plate 77 has integral therewith a pair of rubber bite plugs 78, which extend into the mouth of the user. By biting on the bite plugs 78, the plate 77 is held between the lips and teeth of the user to enable the oxygen to flow into the mouth of the user through the opening in the plate 77.

The housing 76 has a flexible strap 79 connected thereto. A pair of nose clamps or clips 80, which are resiliently biased towards each other by a spring 81 passing through a loop in the end of the strap 79 and secured to each of the nose clamps 80, clamps the passages in the user's nose closed. Thus, the user must exhale through the opening in the plate 77 into the interior of the housing 76. The exhalation by the user forces open a relief valve 82, which is carried by the housing 76 and communicates with the chamber in the housing 76, to enable the exhaled air to flow to the ambient air. The relief valve 82 includes resilient means such as a spring, for example, biasing a valve element to a closed position except when the user exhales to overcome the force of the spring.

The mouthpiece 76 with the nose clamps 80 would be carried within the pouch 32 (see FIG. 4) in the same manner as the mask 37 is carried therein. The operation of use is the same as that described with the mask 37.

Referring to FIG. 8, there is shown a cover 85, which is utilized in place of each of the covers 24. The cover 85 is formed of the same material as the cover 24.

Each of the covers 85 has a timer 86 disposed therein. The timer 86 is selected so that it produces an alarm signal through a bell, for example, a predetermined period of time after being activated. The predetermined period of time in which the bell produces an alarm signal after the timer 86 is activated is no greater than the time for depletion of the oxygen from the cartridge 17 and preferably slightly less, such as one minute less, for example. Therefore, if the cartridge 17 produces oxygen for fifteen minutes after being ignited, the timer 86 would produce the alarm signal fourteen minutes after having been activated. This would give the wearer of the mask 37 (see FIG. 4) or the mouthpiece 75 (see FIG. 7) enough time to ignite another of the cartridges 17 (see FIG. 8) in one of the housings 12 with which the cover 85 cooperates.

One suitable example of the timer 86 is a timer sold by Lux Time Division of Robertshaw Controls Company as model CAT 321 050 and producing an alarm signal fourteen minutes after having been activated. The timer 86 differs from the timer 50 (see FIG. 3) in that a shaft 87 (see FIG. 8) is fixed and cannot move vertically relative to the timer 86.

The shaft 87 has its upper end fixed to the activating element 60. The shaft 87 has an extension 88 secured to its lower end with the extension 88 having a pointed end 89. The pointed end 89 is disposed just above the top of the cartridge 17.

The annular plate 58 is secured to the bottom of the timer 86 and has the slot 63 (see FIG. 5) formed therein. The spring 59 (see FIG. 8) acts against the bottom of the plate 58 to urge the timer 86 upwardly until the flange 67 on the lower end of the activating element 60 engages a surface 90 of the cover 85 to form a seal therewith. This prevents loss of oxygen to the ambient air from the cartridge 17, when it is ignited. If desired, one or both of the flange 67 and the surface 90 can have suitable sealing means thereon.

The cover 85 has an inner cylindrical surface 91 at its upper end of smaller diameter than the diameter of the remainder of inner wall 92 of the cover 85. The inner cylindrical surface 91 is disposed adjacent the circumference of the timer 86 to guide the timer 86 when it is moved vertically due to depression of the activating element 60.

Downward movement of the timer 86 is prevented until the slot 63 (see FIG. 5) in the plate 58 is aligned with a radially extending rib 93 (see FIG. 8), which has the same thickness as the rib 64 (see FIG. 5) but extends inwardly for a smaller distance. This is because the rib 93 (see FIG. 8) must not prevent downward movement of the timer 86 when the slot 63 (see FIG. 5) is aligned with the rib 93 (see FIG. 8).

This alignment of the slot 63 (see FIG. 5) in the plate 58 with the rib 93 (see FIG. 8) can occur only after the shaft 87 of the timer 86 has been rotated by the activating element 60 to set the timer 86 at the desired time period through the shaft 87 rotating a gear in the timer 86 connected thereto for rotation therewith. When the timer 86 is moved downwardly by the activating element 60 after the slot 63 (see FIG. 5) in the plate 58 is aligned with the rib 93 (see FIG. 8), the pointed end 89 of the shaft extension 88 pierces the top of the cartridge 17 so that ignition of the oxygen generating material therein occurs in the manner described in the aforesaid Churchill et al. patent. Thus, ignition of the oxygen generating material within the cartridge 17 cannot occur until the timer 86 has been set at the desired period of time so as to sound an alarm signal no later than when the time period for depletion of the oxygen from the cartridge 17 has expired.

The cover 85 has the tube 27 (see FIG. 1) connected thereto in the same manner as the tube 27 is connected to the cover 24. Thus, the cover 85 (see FIG. 8) is retained on the housing 12 in the same manner as described for the cover 24 (see FIG. 3). The remainer of the structure for the cover 85 (see FIG. 8) is the same as that described for the cover 24 (see FIG. 3).

While the present invention has shown and described the oxygen supply apparatus 10 as being utilized by a coal miner, it should be understood that the oxygen supply apparatus 10 of the present invention can be employed anywhere that a portable oxygen supply apparatus is desired. Thus, the support member for the oxygen supply apparatus 10 could be other than the belt 11.

While the cover 24 or 85 has been shown as being held against the housing 12 by the tubes 27 and 28 and the strip 30, it should be understood that the cover 24 or 85 may be retained on the housing 12 by any other suitable means. For example, the housing 12 could have threads on the upper end of its outer surface for cooperation with threads on the inner wall 26 of the cover 24 or with threads on the inner wall 92 of the cover 85.

An advantage of this invention is that inadvertent activation of generation of the oxygen is prevented. Another advantage of this invention is that easy replacement of an oxygen generating cartridge is accomplished while oxygen is being produced from another cartridge. A further advantage of this invention is that a relatively inexpensive oxygen supply apparatus is provided. Still another advantage of this invention is that it provides an alarm to indicate to the user when a new oxygen generating cartridge must be activated. A still further advantage of this invention is that it does not interfere with the work of the user.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. An oxygen supply apparatus comprising:

a support member;

a plurality of housings;

means to support each of said housings on said support member;

each of said housings having a cartridge of oxygen generating material disposed therein, which material generates oxygen when ignited;

means to insulate against transmission of heat from said cartridge to said housing during generation of oxygen by the oxygen generating material;

a cover for each of said housings;

each of said housings having a chamber therein to receive oxygen from said cartridge when the oxygen generating material in said cartridge is ignited;

oxygen receiving means to be worn by a user; and means to communicate each of said chambers with said oxygen receiving means;

each of said covers including means to cause ignition of the oxygen generating material within said cartridge in said housing having said cover;

each of said housings including the cover and a bottom portion, with the bottom portion having a detachably mounted end, with resilient means between said end and the bottom of a cartridge in said housing, serving to separate the bottom of the cartridge and the end so as to inhibit heating of the end by heat from the cartridge and serving to urge the cartridge to a predetermined position within the housing, away from said end, and timed signal means which may be set to produce an alarm signal that occurs a predetermined period of time after such setting, with such predetermined period of time being equal to or less than the time period for which the oxygen generating material is effective in said cartridge to generate oxygen; and means for preventing operation of the ignition means and so preventing ignition of the oxygen generating material in the cartridge without the setting of such signal means.

2. An apparatus according to claim 1 wherein the ignition causing means includes a rod member for movement with respect to the oxygen generating cartridge, the movement of which is prevented by said ignition preventing means when the timed signal means is not set, and is permitted when such signal means is set, so that an alarm signal will be produced after the predetermined period of time after ignition, which time is related to the effective oxygen generating time of the cartridge.

3. An apparatus according to claim 1 wherein each of the housings is cylindrical, the detachably mounted end of the bottom portion of the housing is flat, the resilient means between the detachably mounted end and the bottom of the cartridge in the housing is a spring and the bottom portion of the housing includes openings therein to assist in dissipating heat produced in the generation of oxygen from the cartridge.

4. An oxygen supply apparatus comprising:

a support member;

a plurality of housings;

means to support each of said housings on said support member;

each of said housings having a cartridge of oxygen generating material disposed therein, which material generates oxygen when ignited;

a cover for each of said housings;

each of said housings having a chamber therein to receive oxygen from said cartridge when the oxygen generating material in said cartridge is ignited;

oxygen receiving means to be worn by a user; and means to communicate each of said chambers with said oxygen receiving means;

each of said covers including means to cause ignition of the oxygen generating material within said cartridge in said housing having said cover;

each of said housings including the cover and a bottom portion, with the bottom portion having a detachably mounted end, with resilient means between said end and the bottom of a cartridge in said housing, serving to separate the bottom of the cartridge and the end so as to inhibit heating of the end by heat from the cartridge and serving to urge the cartridge to a predetermined position within the housing, away from said end, and timed signal means which may be set to produce an alarm signal that occurs a predetermined period of time after such setting, with such predetermined period of time being equal to or less than the time period for which the oxygen generating material is effective in said cartridge to generate oxygen; and means for preventing operation of the ignition means and so preventing ignition of the oxygen generating material in the cartridge without the setting of such signal means.

5. An apparatus according to claim 4 wherein the ignition causing means includes a rod member for movement with respect to the oxygen generating cartridge, the movement of which is prevented by said ignition preventing means when the timed signal means is not set, and is permitted when such signal means is set, so that an alarm signal will be produced after the predetermined period of time after ignition, which time is related to the effective oxygen generating time of the cartridge.

6. An apparatus according to claim 4 wherein each of the housings is cylindrical, the detachably mounted end of the bottom portion of the housing is flat, the resilient means between the detachably mounted end and the bottom of the cartridge in the housing is a spring and the bottom portion of the housing includes openings therein to assist in dissipating heat produced in the generation of oxygen from the cartridge.

* * * * *